(12) United States Patent
Phillips

(10) Patent No.: US 9,040,848 B2
(45) Date of Patent: *May 26, 2015

(54) OPEN BACK JUNCTION BOX AND METHOD FOR PRE-FAB WIRING

(71) Applicant: Bruce G. Phillips, Gilbert, AZ (US)

(72) Inventor: Bruce G. Phillips, Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,506

(22) Filed: Jun. 3, 2013

(65) Prior Publication Data

US 2013/0255988 A1  Oct. 3, 2013

Related U.S. Application Data

(63) Continuation-in-part of application No. 12/636,519, filed on Dec. 11, 2009, now Pat. No. 8,455,772, which is a continuation-in-part of application No. 12/199,648, filed on Aug. 27, 2008, now Pat. No. 8,168,887.

(51) Int. Cl.
| | |
|---|---|
| *H05K 7/14* | (2006.01) |
| *H05K 5/00* | (2006.01) |
| *H05K 5/02* | (2006.01) |
| *H01R 43/00* | (2006.01) |
| *H02G 1/00* | (2006.01) |
| *H02G 3/08* | (2006.01) |
| *H02G 3/00* | (2006.01) |
| *H02G 3/12* | (2006.01) |

(52) U.S. Cl.
CPC . *H02G 1/00* (2013.01); *H02G 3/08* (2013.01); *Y10T 29/49117* (2015.01); *H02G 3/00* (2013.01); *H02G 3/126* (2013.01)

(58) Field of Classification Search
USPC ......... 174/50, 51, 520, 535, 58, 63, 528, 551; 29/825; 220/3.2, 4.02
See application file for complete search history.

(56) References Cited

U.S. PATENT DOCUMENTS

| | | | |
|---|---|---|---|
| 3,676,571 | A | 7/1972 | Rubinstein |
| 4,041,383 | A | 8/1977 | Howard |
| 4,165,443 | A | 8/1979 | Figart |
| 4,569,458 | A | 2/1986 | Horsley |
| 4,678,259 | A | 7/1987 | Petit |
| 4,931,597 | A | 6/1990 | Kimbrough et al. |
| 4,951,923 | A * | 8/1990 | Couture ................. 254/134.3 R |
| 5,098,046 | A | 3/1992 | Webb |
| 5,169,013 | A | 12/1992 | Lammens, Jr. |
| 5,243,134 | A | 9/1993 | Nattel |
| 5,293,003 | A | 3/1994 | Prairie, Jr. |

(Continued)

*Primary Examiner* — Timothy Thompson
*Assistant Examiner* — Sherman Ng
(74) *Attorney, Agent, or Firm* — Kenneth L. Green; Averill & Green

(57) ABSTRACT

A bracket and open back junction box assembly allows simplified wiring at a construction site. An open back junction box including a detachable and reattachable rear cover plate is pre-assembled with a plaster ring, electrical device, and leads, at a prefab facility. A Metal Clad (MC) cable may be attached to the open back junction box and wires carried in the MC Cable may be connected to the leads. A mounting bracket is generally sandwiched between the open back junction box and the plaster ring for mounting to framing members at the construction site. Following assembly at the prefab facility, the prefab open back junction box is shipped to the construction site where the bracket and open back junction box assembly is mounted to framing members. Connections to wires carried by MC Cables are then facilitated by removing the rear cover plate to access the open back junction box interior.

19 Claims, 8 Drawing Sheets

(56) References Cited

U.S. PATENT DOCUMENTS

| | | |
|---|---|---|
| 5,389,740 A | 2/1995 | Austin |
| 5,480,053 A | 1/1996 | Jorgensen |
| 5,736,674 A | 4/1998 | Gretz |
| 6,180,879 B1 | 1/2001 | Gretz |
| 6,207,894 B1 | 3/2001 | Reiker |
| 6,311,637 B1 | 11/2001 | Moss |
| 6,369,322 B1 | 4/2002 | Gretz |
| 6,521,834 B1 | 2/2003 | Dykhoff et al. |
| 6,723,918 B2 | 4/2004 | Vrame |
| 6,770,811 B1 | 8/2004 | Gretz |
| 6,777,611 B2 | 8/2004 | Ewald et al. |
| 6,861,585 B1 | 3/2005 | Kiely |
| 6,871,827 B2 | 3/2005 | Petak et al. |
| 6,955,559 B2 | 10/2005 | Pyrros |
| 6,996,943 B2 | 2/2006 | Denier et al. |
| 7,053,300 B2 | 5/2006 | Denier et al. |
| 7,098,399 B1 | 8/2006 | Gretz et al. |
| 7,189,928 B2 | 3/2007 | Denier |
| 7,192,289 B2 | 3/2007 | Kowalski |
| 7,259,337 B1 | 8/2007 | Gretz |
| 7,427,714 B1 | 9/2008 | Lamens et al. |
| 7,572,977 B2 | 8/2009 | Gorman |
| 7,754,967 B2 | 7/2010 | Kruse et al. |
| 2004/0040167 A1 | 3/2004 | Hall |
| 2005/0056447 A1 | 3/2005 | Nakamura et al. |
| 2008/0035363 A1* | 2/2008 | Yan .................................. 174/58 |

* cited by examiner

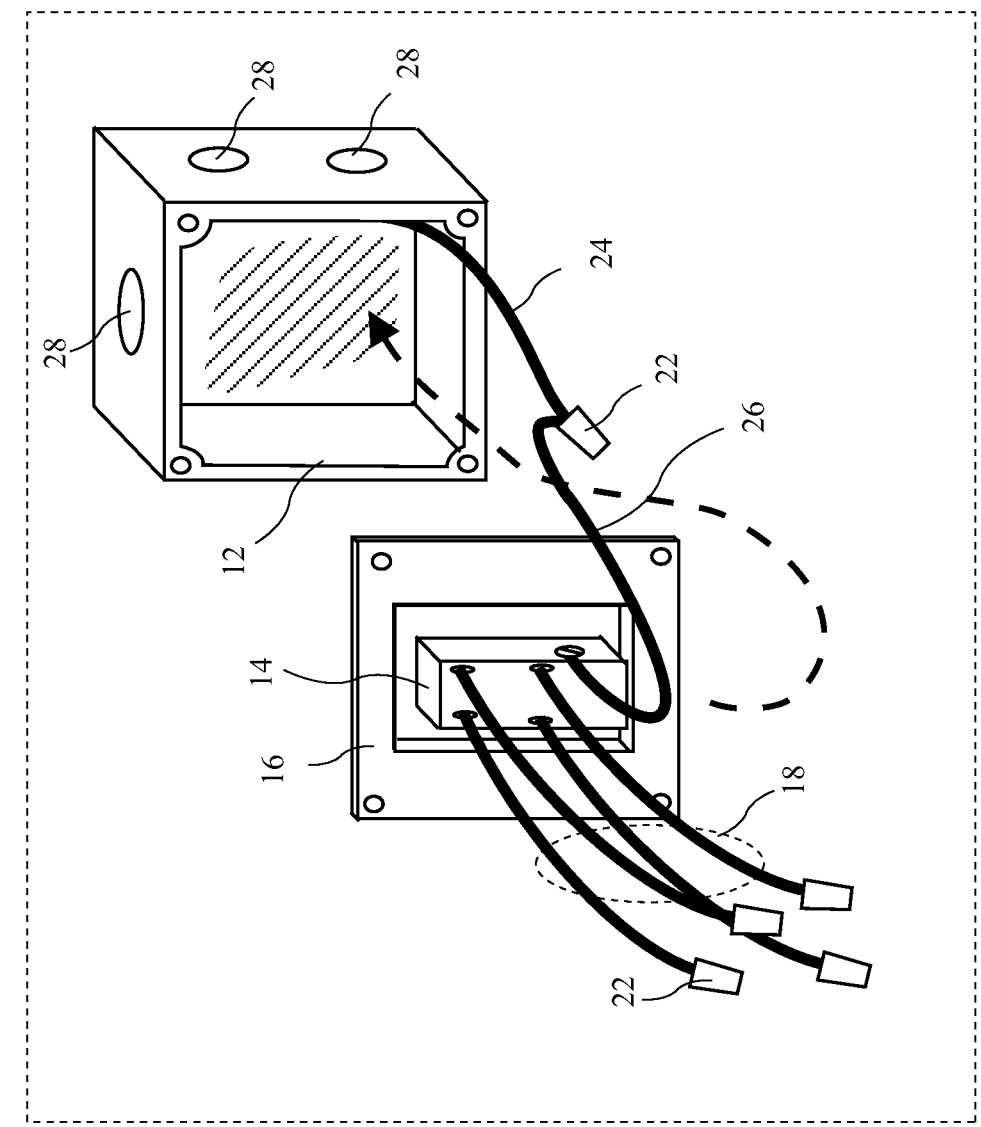
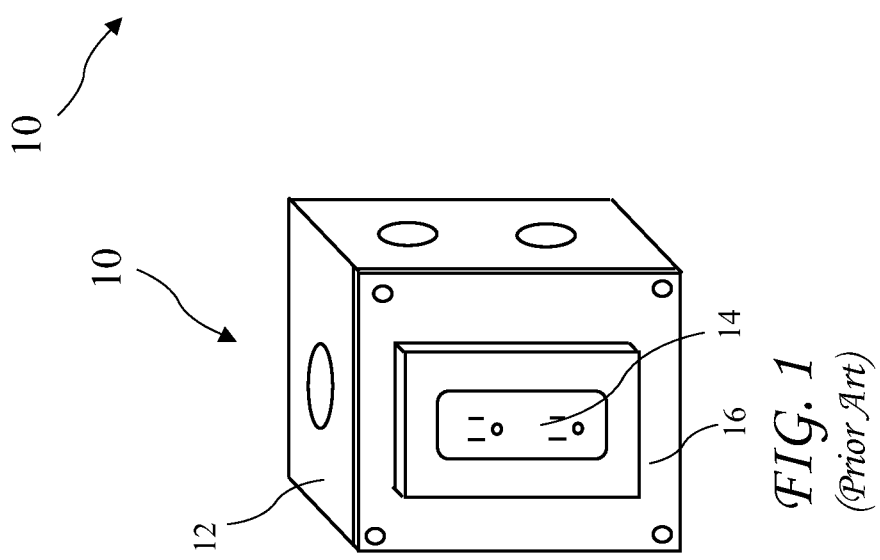
FIG. 1
(Prior Art)
FIG. 2
(Prior Art)

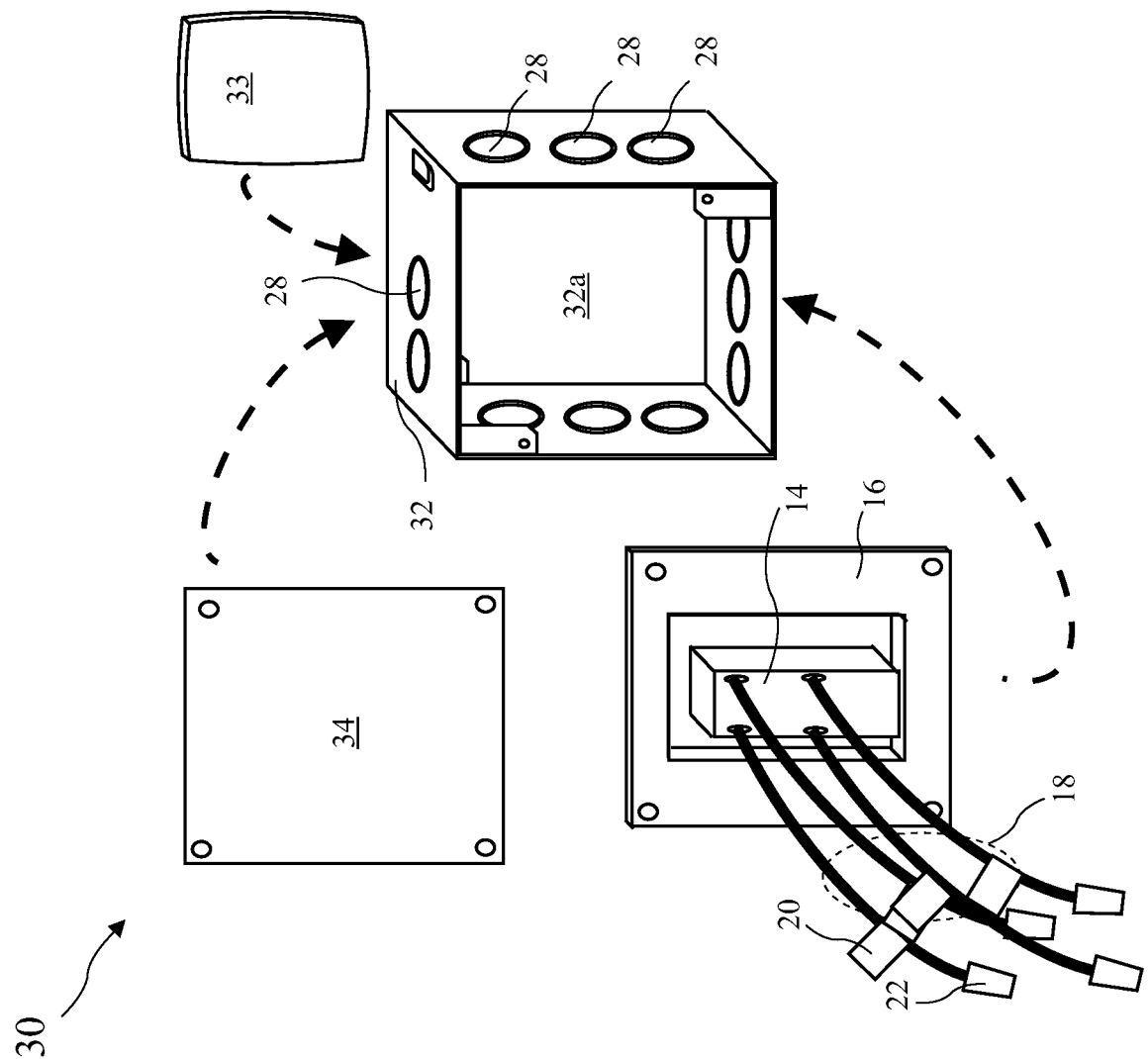
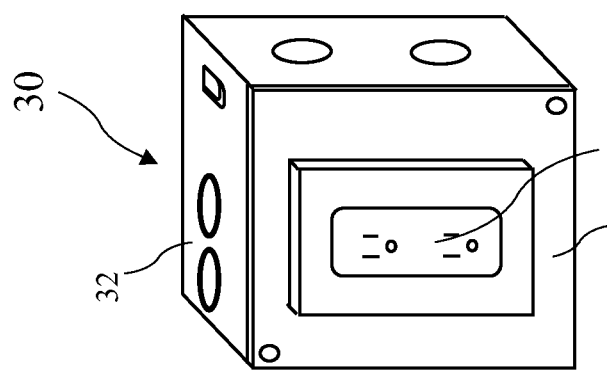
FIG. 5
FIG. 4

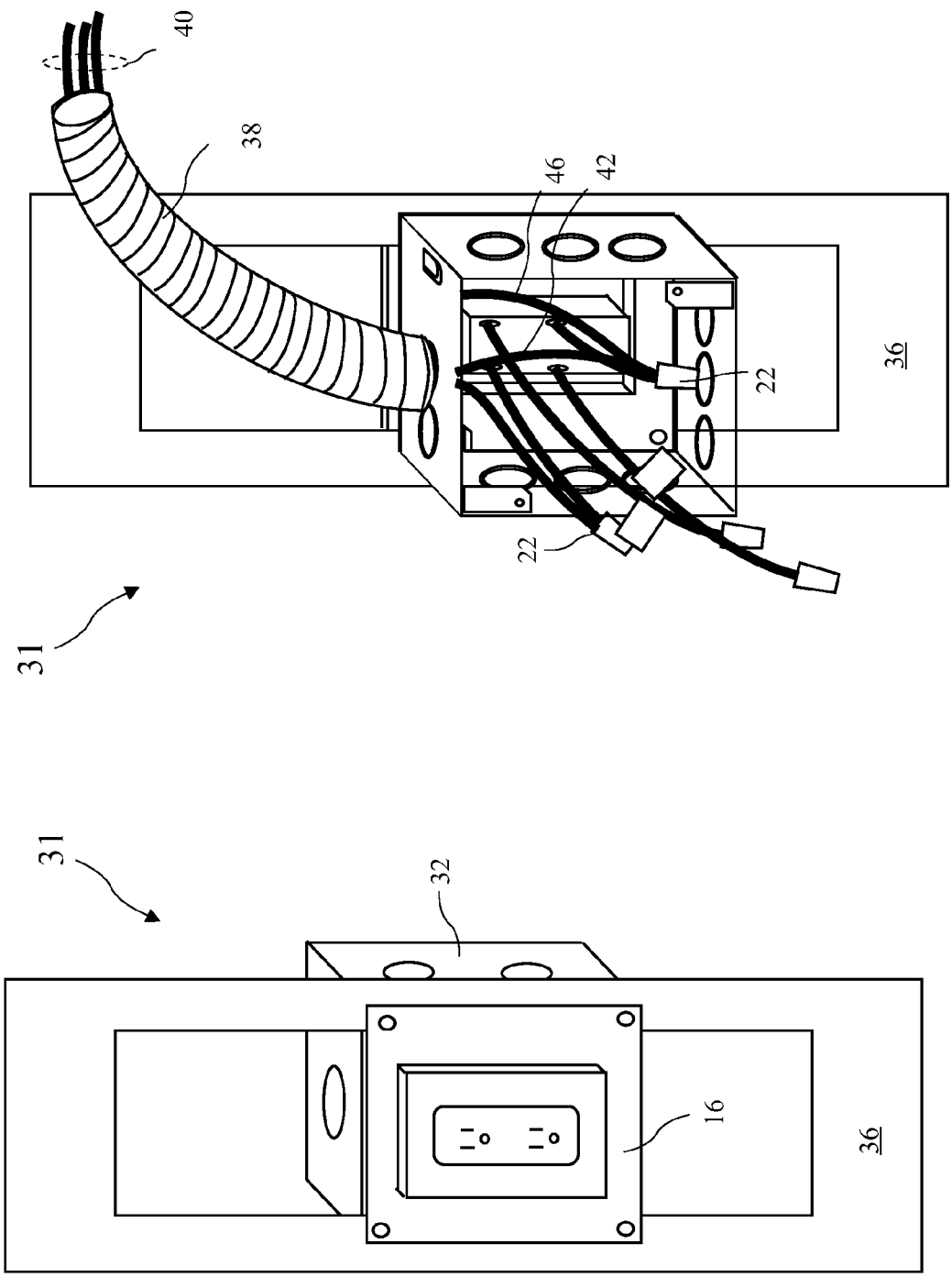

OPEN BACK JUNCTION BOX AND METHOD FOR PRE-FAB WIRING

The present application claims the priority of U.S. Provisional Patent Application Ser. No. 60/975,609 filed Sep. 27, 2007 and is a Continuation In Part of U.S. patent application Ser. No. 12/199,648 filed Aug. 27, 2009 and Ser. No. 12/636,519 filed Dec. 11, 2009, which applications are incorporated in their entirety herein by reference.

BACKGROUND OF THE INVENTION

The present invention relates to prefabricated wiring for buildings under construction and in particular to a method and apparatus for reducing steps required to be performed at the buildings under construction.

Buildings for both residential and commercial use are often constructed using prefabricated elements to reduce cost and construction time. Such prefabricated elements include structure, cabinetry, and electrical. As part of the prefabricated electrical elements, prefab junction box assemblies are commonly assembled off-site, shipped to the construction site, and integrated into the building. Known prefab box assemblies include a junction box, plaster ring (also known as a mud ring), switch or outlet, and wiring. A mounting bracket may be sandwiched or otherwise attached between the junction box and the plaster ring to facilitate mounting the prefab box to framing members at the construction site. Wires are connected to the switch or outlet and are coiled inside the prefab box with wire nuts/connectors over ends of the wires.

The known prefab boxes require disassembly and reassembly at the prefab production facility and again at the construction site, including removing the plaster ring and electrical device (for example, a switch or an outlet), to access the wires inside the prefab box. Unfortunately, such disassembly and reassembly, and handling of the wires, is often time consuming and requires a trained electrician adding cost and schedule penalties to the construction project. Repeated assembly and disassembly also contributes to broken or loose wires which result in additional re-work and subsequent costs.

Known prefab boxes further require the use of a "ground-clip" which while approved by UL and the NEC, is not liked by contractors and inspectors. The use of a ground clip also results in interference with other elements of the junction box, for example, some common types of plaster rings and fittings, and most notably interferes with a two-gang adjustable plaster ring.

BRIEF SUMMARY OF THE INVENTION

The present invention addresses the above and other needs by providing a bracket and open back junction box assembly and method which allows simplified wiring at a prefab production facility and a construction site. The open back junction box including a detachable and reattachable rear cover plate is pre-assembled with a plaster ring, electrical device (for example, a switch or an outlet), and leads attached to the electrical device, at a prefab facility. A Metal Clad (MC) cable and/or Electrical Metal Tubing (EMT) may be attached to the open back junction box and wires carried in the MC Cable or EMT may be connected to the leads. A mounting bracket may be sandwiched between the open back junction box and the plaster ring for mounting to framing members at the construction site, or other mounting means may be used. Following assembly at the prefab facility, the prefab open back junction box is shipped to the construction site where the bracket and open back junction box assembly is mounted to framing members. Connections to wires carried by MC Cables or EMT is then facilitated by removing the rear cover plate to access the interior of the open back junction box.

In accordance with one aspect of the invention, there is provided a method for prefab wiring comprising the steps of constructing a bracket and open back junction box assembly at a prefab production facility using the open back junction box having an open rear and an attachable rear cover plate. The bracket and open back junction box assembly is shipped to a construction site and mounted to a framing member. Wiring at the construction site is accomplished through the open rear to access the open back junction box interior, connecting MC Cable or EMT to the open back junction box, connecting wires carried in the MC Cable or EMT to a electrical device attached to the open back junction box, and attaching the rear cover plate to the open back junction box.

In accordance with another aspect of the invention, there is provided a bracket and open back junction box assembly including an open back junction box having an open back and an attachable rear cover plate for attaching to the open back junction box over the open back. The bracket and open back junction box assembly further includes a plaster ring, a mounting bracket sandwiched between the plaster ring and the open back junction box (or other external mounting means), a switch or an outlet attached to the plaster ring, leads attached to the electrical device, labels on each lead identifying each lead, wire nuts/connector residing over free ends of each lead. The bracket and open back junction box assembly may further include a Metal Clad (MC) cable attached to the open back junction box and wires carried in the MC Cable or EMT connected to corresponding ones of the leads.

In accordance with yet another aspect of the invention, there is provided an open back junction box having an integral threaded ground screw receptacle for attachment of a ground screw. The threaded ground screw receptacle eliminates the need for ground clips which are disliked by contractors and inspectors and result in interference with other elements of the junction box, for example, some common types of plaster rings and fittings, and most notably interferes with a two-gang adjustable plaster ring. The integral threaded ground screw receptacle eliminates these disadvantages.

In accordance with yet another aspect of the invention, there is provided an open back junction box having a lipless open back. The lipless open back provides more and easier access to an installer and allows the easier installation of a fire putty pad. The fire putty pad approximately fills the width and height of the open back junction box. A lip reaching inward around the open back would require the installer to bend and manipulate the fire putty pad (which has the consistency of an asphalt roof shingle) to install the fire putty pad in the back of the box. The lipless open back allow easy insertion of the fire putty pad. Further, known manufacturing methods produce a shape edge on the lip which is likely to cut or scrape an installer's hands.

In accordance with yet another aspect of the invention, there is provided a low cost open back junction box. The open back junction box may be manufactured from a single metal stamping having about the same width as the depth of the open back junction box. Such construction reduces costs by about 30 percent compared to costs of known junction boxes.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a front perspective view of a prior art prefabricated junction box assembly including a closed back junction box.

FIG. 2 is a second front perspective view of the prior art prefabricated junction box assembly with a plaster ring and outlet separated from the junction box.

FIG. 4 is a front perspective view of a prefabricated open back junction box according to the present invention.

FIG. 5 is a rear perspective view of the open back junction box with a rear cover plate according to the present invention and plaster ring detached.

FIG. 6 is a front perspective view of a bracket and open back junction box assembly according to the present invention.

FIG. 7 is a rear perspective view of a bracket and open back junction box assembly according to the present invention with the rear cover plate removed and a metal clad (MC) cable or Electrical Metal Tubing (EMT) attached to the open back junction box and wires carried by the MC Cable or EMT connected to leads in the open back junction box.

Corresponding reference characters indicate corresponding components throughout the several views of the drawings.

DETAILED DESCRIPTION OF THE INVENTION

Figure 3:
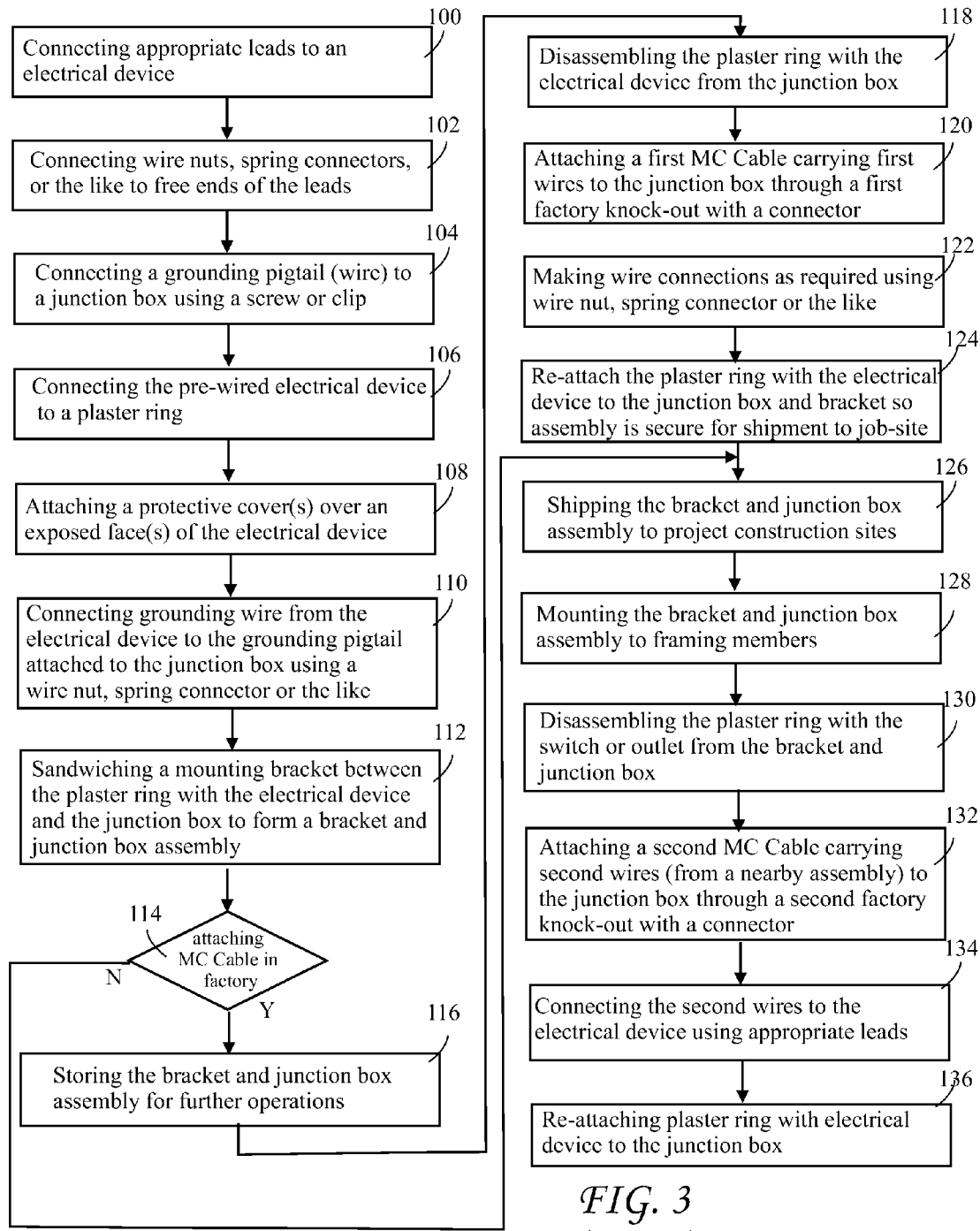
FIG. 3 is a prior art method for prefab wiring including constructing and installing the prior art prefabricated junction box.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front perspective view of a prior art prefabricated junction box assembly 10 is shown in FIG. 1 and a second front perspective view of the prior art prefabricated junction box assembly 10 with a plaster ring 16 and outlet 14 separated from a junction box 12 is shown in FIG. 2. Commonly used junction boxes 12 have a closed back and any internal wiring requires removing the plaster ring 16 or the outlet/switch 14 to access the box interior. The outlet 14 is pre-wired with wires 18 with wire nuts 22 over ends of the wires 18. A grounding pigtail 24 is connected to the junction box 12 and a grounding wire 26 is connected to the outlet 14 and connected by a wire nut 22 to the pigtail 24.

FIG. 3 is a prior art method for prefab wiring including constructing and installing the prior art prefabricated junction box. The prior art method includes steps performed at a prefab facility and steps performed at a construction site. First, a junction box assembly is assembled at a prefab facility by the steps of connecting appropriate leads to an electrical device to form a pre-wired electrical device at step 100, connecting wire nuts, spring connectors, or the like to free ends of the leads at step 102, connecting a grounding pigtail (wire) to the junction box using a screw or a clip at step 104, connecting the pre-wired electrical device to a plaster ring at step 106, attaching protective cover(s) over exposed face(s) of the electrical device at step 108, connecting grounding wire from the electrical device to the grounding pigtail attached to the junction box using a wire nut, spring connector or the like at step 110, and sandwiching a mounting bracket between the plaster ring with the electrical device and a junction box to form a bracket and junction box assembly at step 112.

If an MC Cable is not to be attached at a prefab facility, skipping to step 126, if the MC Cable is to be attached at a prefab facility, at step 114, storing the bracket and junction box assembly for further operations at step 116, disassemble plaster ring with the electrical device from bracket and junction box to access junction box interior at step 118, attaching a first MC Cable carrying first wires to the junction box through a first factory knock-out with a connector at step 120, making wire connections as required using wire nut, spring connector or the like at step 122, re-attaching the plaster ring with the electrical device to the junction box and bracket so assembly is secure for shipment to job-site at step 124. In either case, shipping the bracket and junction box assembly to a construction site at step 126.

When assembly of the junction box assembly is complete, the following steps are carried out at the construction site. Mounting the bracket and junction box assembly to framing members at step 128, disassembling the plaster ring with the electrical device from the bracket and junction box at step 130, attaching a second MC Cable carrying second wires (from a nearby assembly) to the junction box through a second factory knock-out with a connector at step 132, connecting the second wires to the electrical device using appropriate leads at step 134, and re-attaching plaster ring with switches or outlet to the junction box at step 136. Unfortunately, step 132 of attaching a second MC Cable carrying second wires (from a nearby assembly) to the junction box through a second factory knock-out with a connector, is both difficult and time consuming because of the difficulty of working in the small space of the junction box interior with the leads attached to the electrical device and the wires carried by the MC Cables. Additionally, removing the plaster ring to obtaining better access to the junction box interior frees the junction box from the framing member creating further potential problems and repeated assembly and disassembly also contributes to broken or loose wires which result in additional re-work and subsequent costs.

A front perspective view of an open back junction box assembly 30 according to the present invention without a bracket 36 (see FIGS. 6 and 7) is shown in FIG. 4 and an exploded perspective view of the open back junction box assembly 30 according to the present invention with a rear cover plate 34, and a plaster ring 16 and outlet 14, detached from a open back junction box 32 with an open back 32a is shown in FIG. 5. The open back junction box assembly 30 is shown with an outlet 14 attached to the plaster ring 16 but may also have a switch or other electrical device attached. Leads 18 are connected to the outlet 14 and labels 20 attached to identify each lead. Wire nuts 22 (or alternatively spring connectors or the like) reside over free ends of the leads 20. A fire putty pad 33 may also be inserted into the open back junction box 32 where required for "rated" walls. The fire putty pad 33 may be a separate element or may be attached to a second embodiment of the rear cover plate 34 and the fire putty pad 33 preferably fills the height and width of the interior of the open back junction box 32.

A front perspective view of a completed bracket and open back junction box assembly 31 according to the present invention, including the mounting bracket 36, is shown in FIG. 6 and a rear perspective view of the bracket 36 and open back junction box assembly 31 with the rear cover plate 34 (see FIG. 5) removed and a metal clad (MC) cable 38 attached to the open back junction box 32 and wires 40 carried by the MC Cable 38 connected to leads 18 in the open back junction box 32, are shown in FIG. 7. The bracket 36 is sandwiched between the plaster ring 16 and the open back junction box 32. The MC Cable 38 is connected to the open back junction box 32 through a knock out 28 (also see FIG. 5) and two of the wires 40 enter the open back junction box 32 and are connected to two of the leads 18 using the wire nuts 22. A ground wire 42 carried in the MC Cable 38 is connected to a grounding pigtail 46, which grounding pigtail 46 is connected to the open back junction box 32, and to a ground lead 44 connected to the outlet 14, all connected by the wire nut 22. The bracket and open back junction box assembly 31 may be assembled at the prefab production facility with or without the MC Cable 38 and wires 40, and more than one MC Cable 38 may be similarly connected to the open back junction box 32 at the prefab facility.

Figure 8:
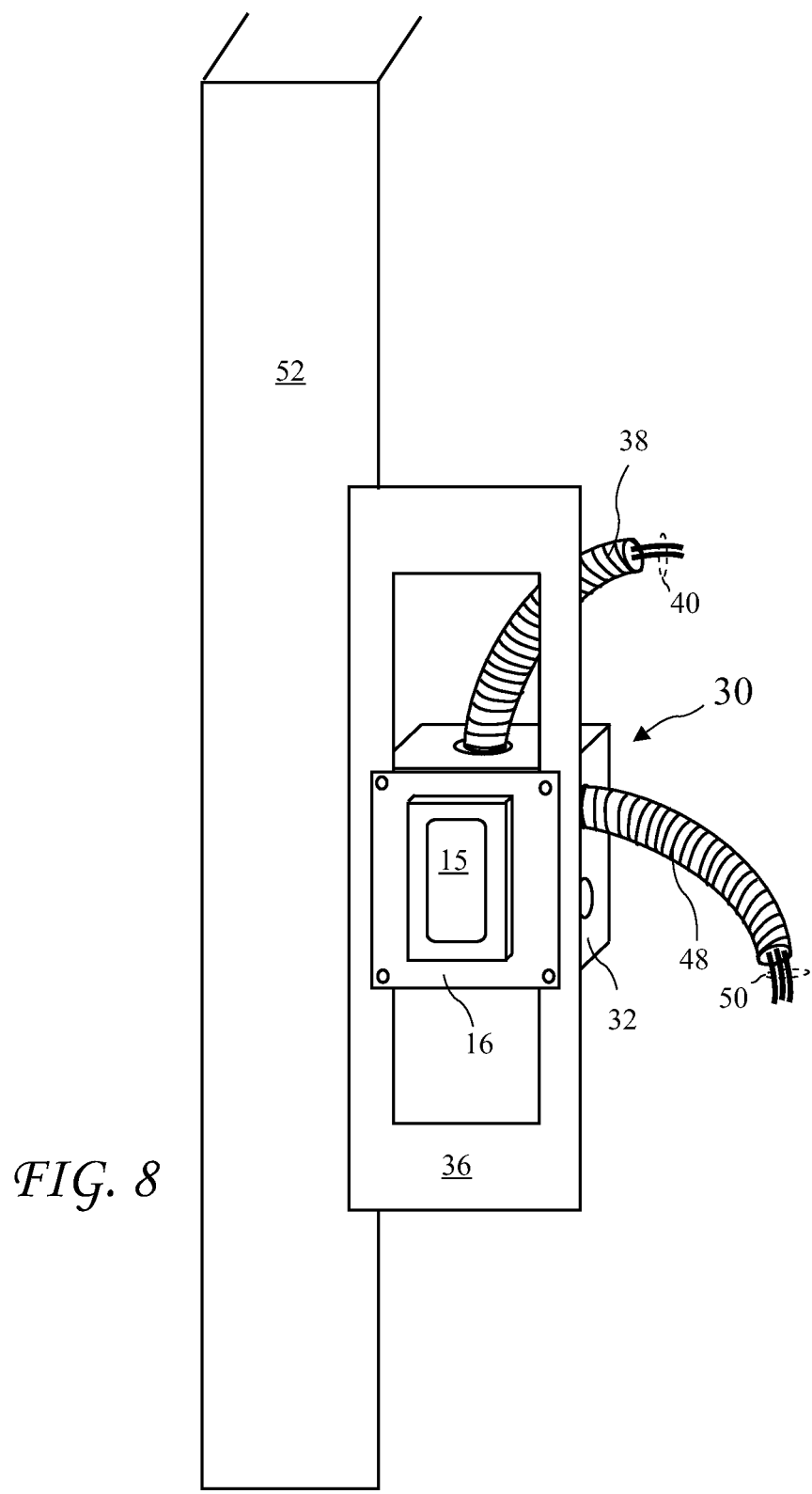
FIG. 8 is a front perspective view of a bracket and open back junction box assembly attached to a frame member.

A front perspective view of the bracket and open back junction box assembly 31 attached to a frame member 52 is shown in FIG. 8. The bracket 36 attaches to the frame member 52. A second (or site) MC Cable 48 is attached to the open back junction box 32 at the construction site, which MC Cable 48 may be the only MC Cable attached to the open back junction box 32. The MC Cable 48 is attached through a knock-out 28 (see FIG. 7). The MC Cable 48 carries additional wires 50 which are connected to corresponding leads 18 inside the box 32 in the same manner as described in FIG. 7, and more than one MC Cable 48 may be similarly connected to the open back junction box 32 at the prefab facility. A protective cover 15 preferably attached at the prefab facility is shown placed over the outlet 14 to prevent damage to the outlet 14.

Figure 9:
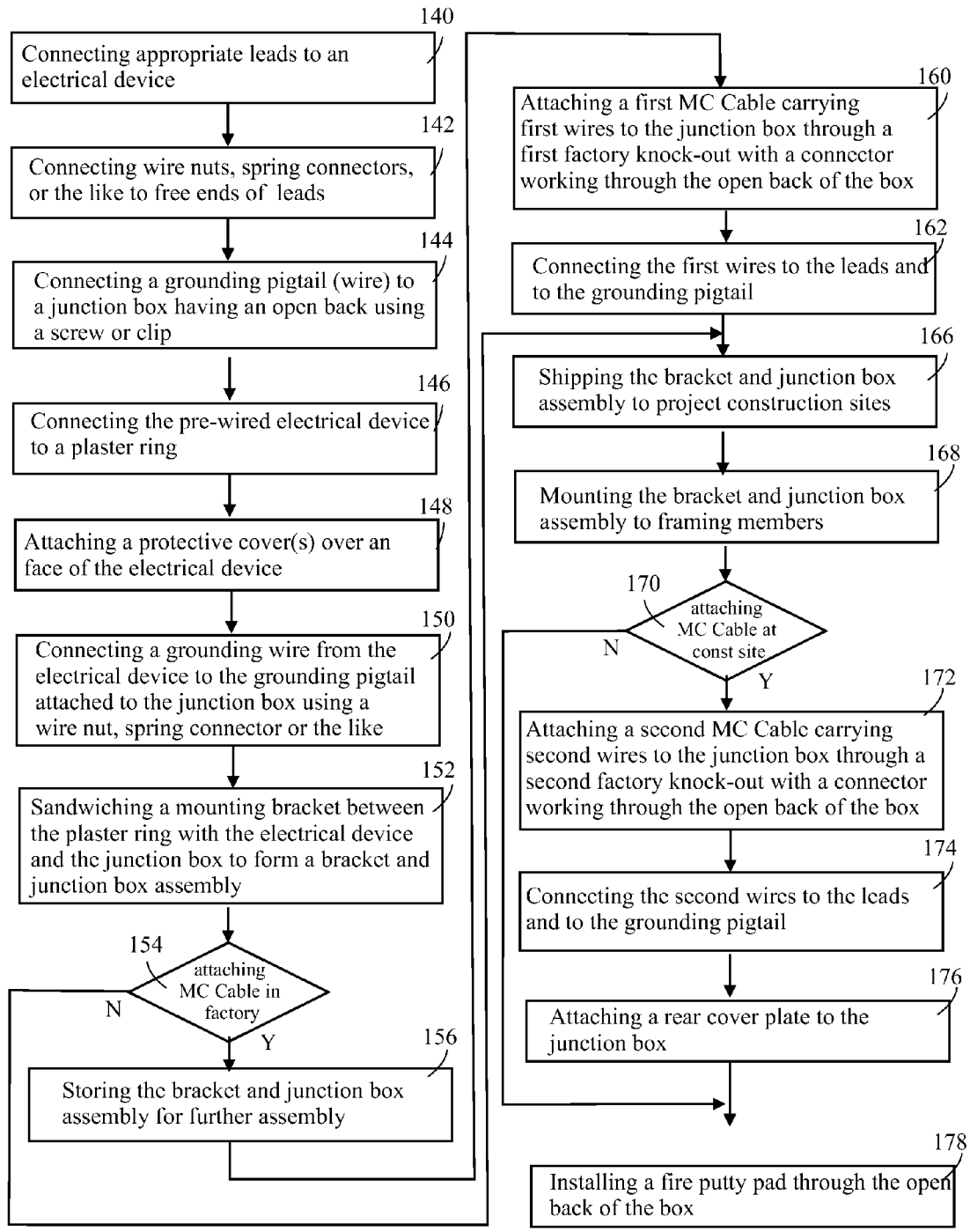
FIG. 9 is a method according to the present invention for prefab wiring including constructing and installing the prefabricated open back junction box according to the present invention.

FIG. 9 is a method according to the present invention for prefab wiring including constructing and installing the open back junction box assembly according to the present invention. The method according to the present invention includes steps performed at the prefab facility to assembly the open back junction box assembly having an open back junction box and steps performed at the construction site to install the open back junction box assembly performing wiring through the open back. First, a open back junction box assembly is assembled at a prefab facility by the steps of connecting appropriate leads to an electrical device to form a pre-wired electrical device at step 140, connecting wire nuts, spring connectors, or the like to the free ends of leads at step 142, connecting a grounding pigtail (wire) to an open back junction box using a screw or clip at step 144, connecting the pre-wired electrical device to a plaster ring at step 146, attaching protective cover(s) over a face of the electrical device at step 148, connecting a grounding wire from the electrical device to the grounding pigtail attached to the open back junction box using either a wire nut, spring connector or the like at step 150, sandwiching a mounting bracket between the plaster ring with the electrical device and the open back junction box to form a bracket and open back junction box assembly at step 152, checking if an MC Cable will be attached in the off-site prefab facility at step 154, if the MC Cable will be attached, storing the bracket and open back junction box assembly for further assembly at step 156, attaching a first (or prefab) MC Cable carrying first wires to the open back junction box through a first factory knock-out, with a connector, working through the open back of the open back junction box, at step 160, and connecting the first wires to corresponding leads and the grounding pigtail using wire nuts, spring connectors or the like at step 162. In either case, shipping the bracket and open back junction box assembly to a construction site at step 166. While step 160 describes attaching a first MC Cable, the method may include attaching two or more MC Cables.

When assembly of the open back junction box assembly is complete, the following steps are later performed at the construction site. Mounting the bracket and open back junction box assembly to framing members at step 168, checking if a second (or site) MC Cable will be attached to the open back junction box assembly at the construction site at step 170 and skipping past step 176 if the second MC Cable is not being attached. If the second MC Cable is being attached at the construction site, attaching the second MC Cable carrying second wires (usually from a nearby open back junction box assembly) to the open back junction box through a second factory knock-out, with a connector, working through the open back of the box, at step 172, connecting the second wires to the appropriate leads and the grounding pigtail at step 174, and re-attaching the rear cover plate to the open back junction box at step 176. In some construction sites, for example where "rated" walls are required, a fire putty pad may also be easily inserted through the open back of the open back junction box at step 178. While step 172 describes attaching a second MC Cable, the method may include attaching two or more MC Cables.

Figure 10A:
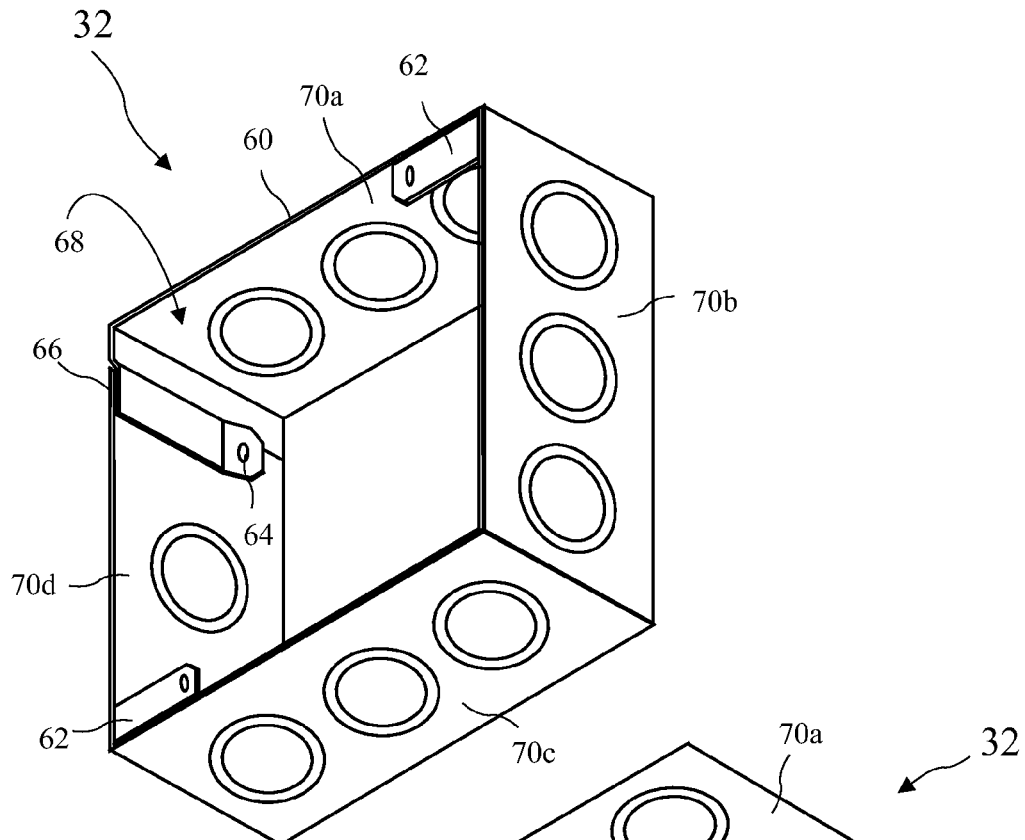
FIG. 10A is a first perspective view of the back of the open back junction box according to the present invention.
Figure 10B:
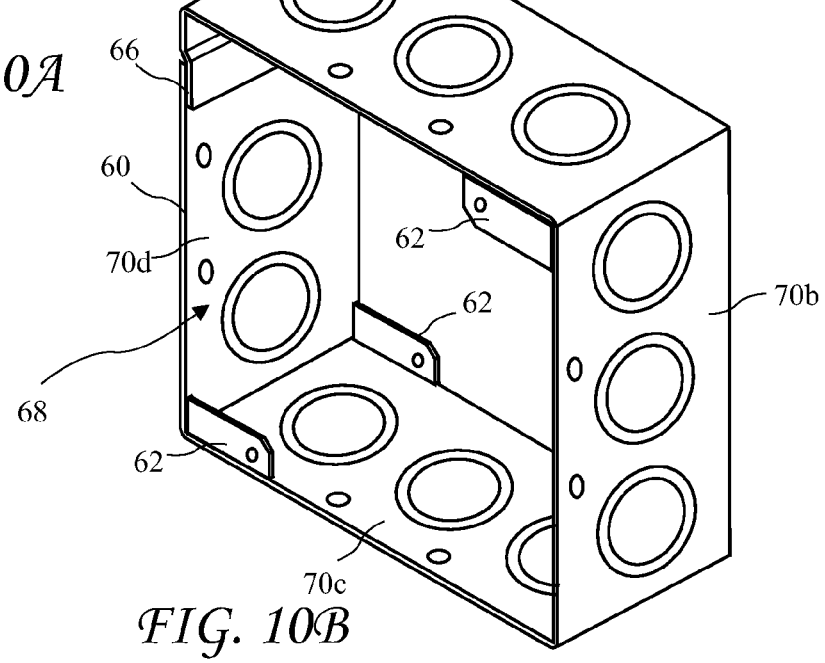
FIG. 10B is a second perspective view of the back of the open back junction box according to the present invention.
Figure 11D:
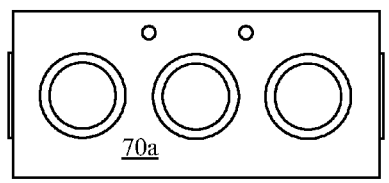
FIG. 11D is a top view of the open back junction box according to the present invention.
Figure 11B:
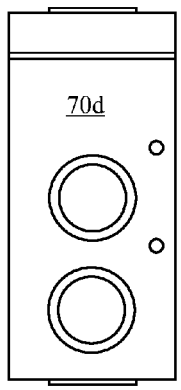
FIG. 11B is a right side view of the open back junction box according to the present invention.
Figure 11A:
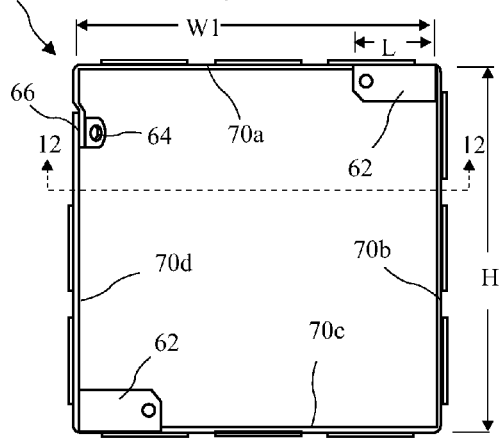
FIG. 11A is a front view of the open back junction box according to the present invention.
Figure 11C:
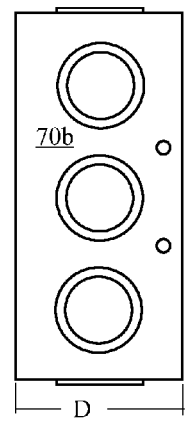
FIG. 11C is a left side view of the open back junction box according to the present invention.
Figure 12:
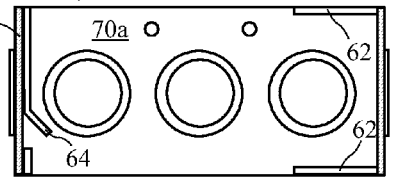
FIG. 12 is a cross-sectional view the open back junction box according to the present invention taken along line 12-12 of FIG. 11A.

A first perspective view of the back of the open back junction box 32 according to the present invention is shown in FIG. 10A, a second perspective view of the back of the open back junction box 32 is shown in FIG. 10B, a front view of the open back junction box 32 is shown in FIG. 11A, a right (viewed from the front) side view of the open back junction box 32 is shown in FIG. 11B, a left side view of the open back junction box 32 is shown in FIG. 11C, a top view of the open back junction box 32 is shown in FIG. 11D, and a cross-sectional view the open back junction box 32 taken along line 12-12 of FIG. 11A is shown in FIG. 12. The open back junction box 32 is constructed from a metal stamping 32' (see FIG. 13) and is joined at an overlap portion 66. An integral threaded ground screw receptacle 64 resides inside the open back junction box 32 and accessible from the front of the open back junction box 32, and is preferably formed on an edge of the metal stamping 32'. The open back junction box 32 has a width Wi, height H, and depth D. For a two gang box, the width W1 is preferably approximately 4.69 inches, the height H is preferably approximately 4.25 inches, and the depth D is preferably approximately 2.13 inches. Three gang, four gang, and larger boxes will have a greater width W1.

The open back junction box 32 has four sides, a top side 70a, a left side 70b, a bottom side 70c, and a right (viewed from the front) side 70d. The sides are substantially parallel having not perceptible taper. The open back junction box 32 preferably includes a lipless back opening 72 allowing maximum access to the interior of the open back junction box 32.

Corner tabs 62 are formed on diagonally opposed corners of front and rear faces of the open back junction box 32 and have a length L of preferably approximately 1.05 inches. The corner tabs 62 on the front face facilitate attaching the mounting bracket 36 and plaster ring 16 to the open back junction box 32 and the corner tabs on the rear face facilitate mounting the detachable rear cover plate 34 to the detachable rear cover plate.

Figure 13:
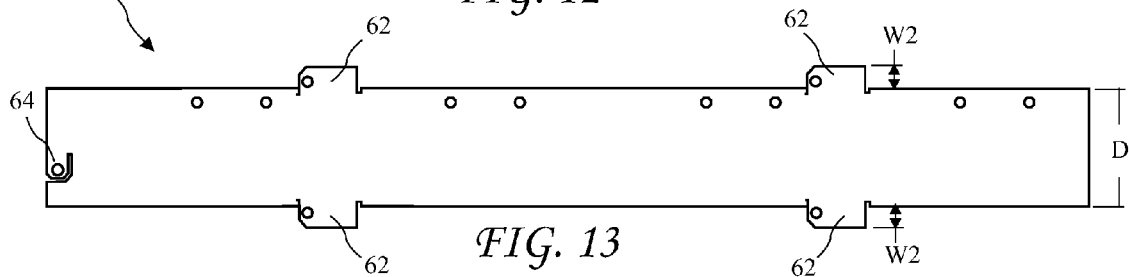
FIG. 13 is a metal stamping used to construct the open back junction box according to the present invention.

A metal stamping 32' according to the present invention, used to construct the open back junction box 32, is shown in FIG. 13. The stamping 32 has a width mostly approximately equal to the depth D of the open back junction box 32, with the exception of provision for the corner tabs 62. The overall width of the stamping 32' is approximately the depth D plus twice the widths W of the corner tabs, thus providing for low cost production.

The open back junction box assembly has been described above for uses where wires are carried to the open back junction box in MC Cables. In other embodiments of the present invention, wires may be carried to the open back junction box in any electrical conduit including Rigid Metal Conduit (RMC), Rigid Nonmetallic Conduit (RNC), Galvanized rigid conduit (GRC), Electrical Metallic Tubing (EMT), Electrical Nonmetallic Tubing (ENT), Flexible Metallic Conduit (FMC), Liquidtight Flexible Metal Conduit (LFMC), Flexible Metallic Tubing (FMT), Liquidtight Flexible Nonmetallic Conduit (LNFC), Aluminium conduit, Intermediate metal conduit (IMC), PVC conduit, other metal conduits, and underground conduit. Preferred electrical conduits are MC Cable and Electrical Metallic Tubing (EMT). In these other embodiments, the apparatus and methods of the present invention, namely working through the open back of a open back junction box, provide benefits similar to wiring using MC Cables.

While the invention herein disclosed has been described by means of specific embodiments and applications thereof, numerous modifications and variations could be made thereto by those skilled in the art without departing from the scope of the invention set forth in the claims.

I claim:

1. A method for prefab wiring comprising the steps of:
    obtaining an open back junction box assembly comprising:
        an open back junction box having an open front for mounting an electrical device and plaster ring, and an open back comprising a single opening opposite the open front for accepting a detachable rear cover plate;
        the plaster ring attached to the open back junction box;
        an electrical device attached to the plaster ring;
        first ends of electrical leads attached to the electrical device; and
        a detachable rear cover plate attachable to the back of the open back junction box over the open back while leaving second ends of the leads inside the junction box and unattached; and
    installing the junction box assembly at a work site without disassembling the electrical device and the plaster ring from the junction box assembly, the installing including the steps of:
        mounting the junction box assembly to a framing member;
        connecting a site electrical conduit to the open back junction box working through the open back of the open back junction box;
        working through the open back of the open back junction box to connect site wires carried in the electrical conduit to the second ends of the electrical leads connected to the electrical device attached to the junction box; and
        attaching the rear cover plate to the back of the open back junction box.

2. The method of claim 1, wherein the open back junction box includes a bracket sandwiched between the electrical device and the plaster ring, and the open back junction box.

3. The method of claim 1, wherein connecting the site wires to the second ends of the leads through the open back of the open back junction box while leaving the first ends of the leads attached to the electrical device.

4. The method of claim 1, wherein the junction box assembly includes a protective cover over a face of the electrical device.

5. The method of claim 1, wherein the junction box assembly includes a prefab electrical conduit attached to the open back box and not detaching the electrical conduit from the open back junction box at the work site.

6. The method of claim 5, wherein the second ends of the leads opposite the first ends are unterminated, the method further including not detaching the leads from the electrical device at the work site.

7. The method of claim 1, wherein the electric conduit is selected from Metal Clad (MC) Cable, Electrical metallic Tubing (EMT), Rigid Metal Conduit (RMC), Rigid Nonmetallic Conduit (RNC), Galvanized rigid conduit (GRC), Electrical Nonmetallic Tubing (ENT), Flexible Metallic Conduit (FMC), Liquidtight Flexible Metal Conduit (LFMC), Flexible Metallic Tubing (FMT), Liquidtight Flexible Nonmetallic Conduit (LNFC), Aluminium conduit, Intermediate metal conduit (IMC), PVC conduit, and underground conduit.

8. The method of claim 1, wherein installing the junction box assembly at a work site further includes installing a fire putty pad through the open back of the open back junction box.

9. The method of claim 1, wherein attaching the rear cover plate to the back of the open back junction box comprises attaching the rear cover plate having a fire putty pad attached to the back of the open back junction box.

10. The method of claim 1, wherein constructing the junction box assembly includes: attaching labels to the leads proximal to the second ends of the leads to identify the leads.

11. The method of claim 1, wherein the open back is about the same size opening as the open front.

12. The assembly of claim 1, wherein the completed installation of the junction box assembly performed at the work site is performed without making electrical connections working through the open front of the junction box.

13. The method of claim 1, wherein the electric conduit is a metal conduit.

14. A method for constructing an open back prefab junction box assembly comprising the steps of:
    providing an open back junction box assembly to a work site, the open back junction box assembly comprising:
        a rectangular open back junction including:
            four sides, opposite ones of the sides being parallel;
            an open front;
            an integrally formed interior ground screw receptacle; and
            an open back comprising a single opening
        a plaster ring attached to the open front of the open back junction box;
        an electrical device attached to the plaster ring opposite the open back junction box and extending into the interior of the open back junction box;

first ends of electrical leads attached to the electrical device;

free ends of each of the electrical leads residing inside the open back junction box; and the detachable rear cover plate attachable to the back of the open back junction box over the open back while leaving the free ends of the leads residing inside the junction box and unattached;

installing the open back junction box assembly at a work site without disassembling the electrical device and the plaster ring from the open back junction box, the installing including the steps of:

mounting the open back junction box to a framing member;

connecting a site electrical conduit to the open back junction box working through the open back of the open back junction box;

working through the open back of the open back junction box to connect site wires carried in the electrical conduit to the second ends of the electrical leads connected to the electrical device attached to the open back junction box; and attaching the rear cover plate to the back of the open back junction box.

15. The method of claim 14, wherein the rectangular open back junction box is a rectangular metal stamping.

16. The method of claim 14, wherein the open back junction box assembly includes a mounting bracket sandwiched between the plaster ring and the open back junction box.

17. The method of claim 14, wherein the open back junction box assembly includes a grounding pigtail attached to the open back junction box and a grounding wire connecting the interior ground screw receptacle.

18. A method for prefab wiring comprising the steps of:

obtaining an open back junction box assembly comprising:

an open front for mounting an electrical device and plaster ring, and an open back comprising a single opening about the same size as the open front and opposite the open front for accepting a detachable rear cover plate;

the plaster ring attached to the open front;

a mounting bracket sandwiched between the plaster ring and the open front;

an electrical device attached to the plaster ring;

a protective cover over a face of the electrical device;

first ends of electrical leads attached to the electrical device;

free second ends of each electrical lead; and a detachable rear cover plate attached to the back of the open back junction box over the open back while leaving the second ends of the leads inside the junction box and unattached;

installing the junction box assembly at a work site without disassembling the electrical device and the plaster ring from the junction box assembly, the installing including the steps of:

mounting the junction box assembly to a framing member;

connecting a site electrical conduit to the open back junction box working through the open back of the open back junction box;

working through the open back of the open back junction box to connect site wires carried in the electrical conduit to the second ends of the electrical leads connected to the electrical device attached to the junction box; and attaching the rear cover plate to the back of the open back junction box.

19. The assembly of claim 18, wherein the open back junction box assembly includes a first end of a grounding pigtail connected to the open back junction box and a first end of a grounding wire connected to the electrical device.

* * * * *